(12) United States Patent
Grunenwald

(10) Patent No.: US 6,766,005 B1
(45) Date of Patent: Jul. 20, 2004

(54) PAYPHONE MANAGEMENT SYSTEM

(75) Inventor: Rodolphe Grunenwald, Joinville le Pont (FR)

(73) Assignee: Schlumberger Systems, Montrouge (FR)

( * ) Notice: Subject to any disclaimer, the term of this patent is extended or adjusted under 35 U.S.C. 154(b) by 0 days.

(21) Appl. No.: 10/019,841

(22) PCT Filed: Jul. 7, 2000

(86) PCT No.: PCT/FR00/01986

§ 371 (c)(1),
(2), (4) Date: May 21, 2002

(87) PCT Pub. No.: WO01/05138

PCT Pub. Date: Jan. 18, 2001

(30) Foreign Application Priority Data

Jul. 9, 1999 (FR) .............................................. 99 08922

(51) Int. Cl.[7] .............................................. H04M 17/00
(52) U.S. Cl. ................................ 379/144.05; 379/88.17
(58) Field of Search ............................ 379/143, 144.05, 379/88.17

(56) References Cited

U.S. PATENT DOCUMENTS

| | | | | |
|---|---|---|---|---|
| 6,118,860 A | * | 9/2000 | Hillson et al. | 379/155 |
| 6,138,245 A | * | 10/2000 | Son et al. | 713/400 |
| 6,243,450 B1 | * | 6/2001 | Jansen et al. | 379/144 |
| 6,314,169 B1 | * | 11/2001 | Schelberg, Jr. et al. | 379/93.12 |
| 6,320,946 B1 | * | 11/2001 | Enzmann et al. | 379/143 |

FOREIGN PATENT DOCUMENTS

| | | | | |
|---|---|---|---|---|
| EP | 0468 913 B1 | 4/1996 | | H04M/17/02 |
| EP | 0746 137 A2 | 12/1996 | | H04M/17/02 |

OTHER PUBLICATIONS

L. Williams, "Payphone Remote Management Systems"; British Telecommunications Engineering, vol. 11, Part 2, Jul. 1992, pp. 85–89.

P. Meade, "Cyberbooths: the new payphone?"; America's Network, Advanstar Communications, vol. 101, No. 11, Jun. 1, 1997; pp. 44,46.

International Search Report, dated Nov. 20, 2000.

* cited by examiner

Primary Examiner—Creighton Smith
(74) Attorney, Agent, or Firm—Osha & May L.L.P.

(57) ABSTRACT

In one embodiment, a telephone system that includes a number of payphones intended for communication with servers via at least one communication network is disclosed. In one embodiment, the communication network includes a communication interface able to monitor communications between the said payphones and at least a first group of servers.

11 Claims, 1 Drawing Sheet

PAYPHONE MANAGEMENT SYSTEM

Figure 1:
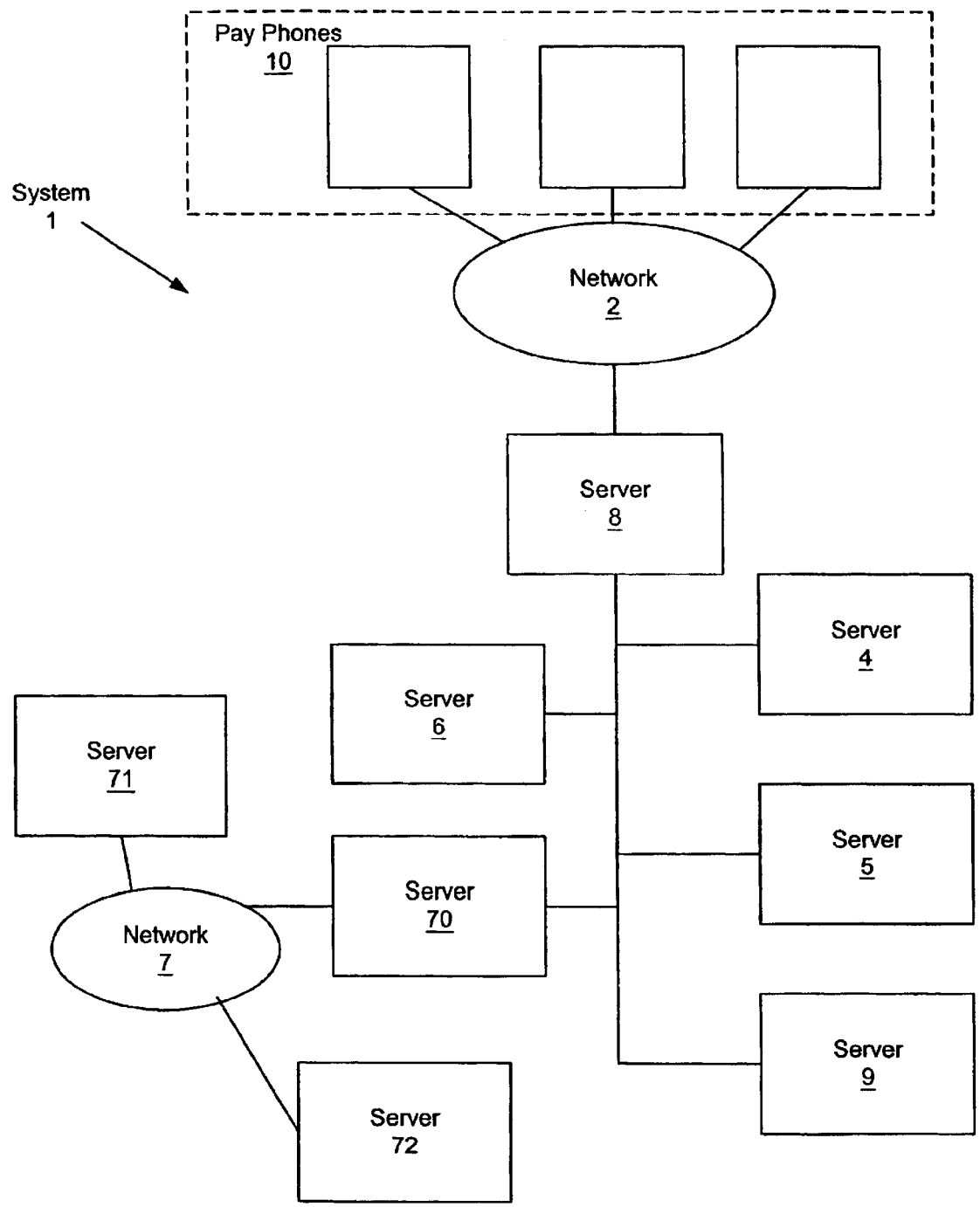

This invention concerns a public telephone system including payphones intended for communication with servers, such as information servers or servers for Web and Internet service. This invention concerns more particularly a communication interface ensuring a link between the payphones and all or part of servers accessed by these payphones.

A payphone network comprises payphones distributed over a given territory. The payphones are connected to a communication network, consisting for instance of the Switched Telephone Network (PSTN), with which they communicate using a modem.

A payphone network generally comprises one (or several) management servers, often called PMS (Payphone Management System), enabling the network operator to supervise the various telephones. This server's function, connected via a modem to the switched telephone network, is to exchange with the telephones information concerning the operation of the telephony system.

Also, the payphone networks are faced with the need to provide other services than the simple transfer of the voice between two telephone stations. In particular, it becomes important to be able to offer access to private-type servers or otherwise to information and service servers on Internet and the Web.

The result is therefore that payphones are faced with the need to get connected with a number of servers. But the adaptation of a telephone and more specially a payphone to allow connection to information servers and particularly to Internet and the Web, creates many technical problems.

This invention therefore aims at solving these problems by simplifying and rationalizing the payphone connection with various servers required for the operation, thus facilitating the maintenance work of payphone system operators and thus the systems profitability.

The payphone system, according to the invention, comprises a number of payphones intended for communication with servers via at least one communication network.

According to the invention, the telephony system is characterized in that it comprises a communication interface able to monitor communications between payphones and at least a first group of servers.

According to another feature of the payphone system, the communication interface does not monitor communications between payphones and the servers that are not part of the first group above mentioned.

According to another feature of the payphone system, the communication interface is able to monitor communications between the whole of the said servers and the payphones.

According to another feature of the payphone system, the addresses of servers whose communications with the payphones are monitored by the communication interface are stored in the said communication interface memories, as the payphones then only have the communication interface address.

According to another feature of the payphone system, the communication interface includes means able to translate the information exchange sessions transiting via the said communication interface between the payphones and the servers, when these sessions are made with servers using communication protocols different from those of the payphones.

According to another feature of the payphone system, each of the payphones is equipped with Internet communication TCP/IP protocols and the communications between the said telephones and the said servers use the said protocols.

According to another feature of the payphone system, the servers accessed by payphones include information servers or servers providing Web and Internet services and/or private information servers and/or servers dedicated to the payphone management.

According to another feature of the payphone system, the communication interface includes means able to synchronize and regulate the information exchange sessions between the payphones and the servers, regarding sessions transiting via the communication interface.

According to another feature of the payphone system, the communication interface includes means able to authenticate information exchange sessions between the payphones and the servers, regarding sessions transiting via the communication interface.

According to another feature of the payphone system, the communication interface includes means able to detect possible virus concerning the files transferred during information exchange sessions between payphones and servers, regarding the sessions transiting via the said communication interface.

The following description in connection with the attached drawing given as a non-limiting example will explain clearly what the invention is about and how it may be embodied.

FIG. 1 is a diagrammatic view of a payphone network according to the invention.

The only items shown are the items of the payphone network required for understanding the invention.

In FIG. 1 is shown a network 1 of public telephony. This network includes a set of payphones 10 (set including from several hundred to several thousand telephones, even several dozen thousands, according to the territory covered).

The payphones 10 are intended to be used by the public in self-service and are therefore installed for this purpose in public places, such as the street, or semi-public places, such as commercial centers, airports, hotel lounges, restaurants, shops, etc.

These payphones 10 enable the users to make telephone communications to private telephones or payphones, using an appropriate telephone network marked 2. This telephone network 2 is switched analogue of the PSTN type (Public Switching Telephone Network) or digital ISDN (Integrated Services Digital Network). This network 2 may also be made of a mobile radiotelephone network and this, whatever its nature: GSM, CDMA, TDMA, AMPS, D-AMPS, or also made of the Internet network, or more generally of any communication network able to transfer data (X25, Ethernet, . . . ) as well as of any combination of such networks.

The payphones 10 are also adapted, as detailed below; to access information servers or servers providing services 71, 70 on the Web and Internet 7, as well as information servers or private servers providing services 9. Such accesses enable the operator of network 1 to offer users a wide range of new services, going for instance and in a non-limiting way, from reading their e-mail to consulting local information (list of medical doctors on duty in the payphone area, etc . . . ).

In this description, private servers will be the name given to servers owned by operators that are only accessible on private networks of the type LAN (Local Area Network) or WAN (Wide Area Network) and this subject to having an appropriate authorization. These private servers are different from Web or Internet servers that are basically of free and public access.

Of course this invention is not limited to payphones offering such access to Internet and private servers. This invention also concerns payphones offering only an access to Internet or only an access to private servers, even also payphones offering none of these new services to the user.

These payphones 10 are also adapted to accede to servers 4, 5, 6 more specifically dedicated to the operation and management of the payphone network 1.

The server 5 ensures the management of payphones 10. This server 5 is also named PMS (Payphone Management System). PMS 5's function is to exchange with all the payphone 10 information concerning their operation and more generally the payphone system operation. Furthermore, the PMS 5 server manages the payphones initialization sessions and sets statistical data from the information received from the payphones 10.

The payphones 10 and the PMS 5 are fitted with appropriate means of information supervision and reception/transmission, but these means being themselves known will not be described in more detail. These supervision and reception/transmission means are responsible for the organization of information exchanges between the payphones 10 and the PMS 5 or the FTP 4 server, the role of which will be detailed below, in particular for the monitoring of data, files and/or software programs transfers between the payphone 10 and the server FTP 4.

It is in particular a question of transferring to payphones 10 the files required for their operation, such as tables of rates, configuration parameters regarding the type of numbering, lists of opposition or of watching the means of payment used, or also status files for the payphones. The payphones 10 transmit, as far as they are concerned, information regarding their use, i.e. a daily report including data relating to the transactions made, the traffic, and a report on alarms enabling to warn PMS 5 of the occurrence of problems or interference with their integrity, such as a breakdown of the card reader or a handset torn, so as to arrange a service by a watching agent.

To facilitate the data exchange, a specific server 4 is used, called FTP (File Transfer Protocol). Starting with the orders received via the PMS 5, each payphone 10 goes and connects with the FTP 4 and downloads or uploads the appropriate data.

Also, the payphones 10 may be connected to a server 6 that is used as a communication interface between the payphones 10 and the servers, the server being called PROXY. The functions of PROXY 6 are detailed hereafter in greater detail.

To access to the Web and Internet 7, the payphones 10 use an Internet service provider 70 also called ISP (Internet Service Provider). The accessible servers of Web and Internet 7 are information or service servers 71, 72, such as electronic mail servers or servers for E-commerce.

The private server 9 may, as far as it is concerned, manage the services adapted to the payphone network, such as publicity, horoscope, weather forecast, municipal services, etc.

The services offered to the user, whether it is the possibility to call another telephone station or the possibility to get connected to Internet or private information servers, are typically invoiced either at the level of the payphone itself, through coins, prepaid cards, electronic purse, or other equivalent means, or invoiced later, using credit cards or subscriber cards for instance.

These payphones 10 are, as known, terminals especially designed for use on a public or semi-public site. They therefore have special features regarding the constitutive items and software programs (microprocessor, memory, etc.), the energy consumption, ergonomics, usage, etc, well known themselves and not detailed further.

Each payphone 10 includes therefore a number of particular items, payphone-sensitive, especially regarding ergonomics. In particular may be found visualization and data logging devices, such as a screen 11 and a keyboard 12. On the other hand, the payphone 10 uses software programs enabling the information exchange and display best suited for its ergonomics, although it operates according to hypermedia link principles.

In particular, each payphone 10 includes in these electronic circuits material and especially software resources, such as a browser, required for setting and operating a man-machine interface enabling access to the Web and Internet 7 or also consulting the private information servers if the payphone 10 offers such services.

Also, to enable the connection to be made to the various servers and in particular to PROXY 6, payphones 10 are equipped with TCP/IP communication protocols complying with the technical guidelines of IETF (Internet Engineering Task Force).

The servers to which the payphones 10 of the telephony network 1 according to this invention can be connected are diagrammatically distributed in two separate sets. A first group assembles the servers implementing the complex applications requiring elaborated communication protocols such as (http . . . ) required by servers 71,72 of Internet and Web, the private server 9 or the server PMS 5, communication protocols different from the one used in the payphones 10. The second group comprises the servers implementing less complicated applications, such as the server FTP 4, servers using the same protocol as payphones 10 or a compatible protocol.

According to a first embodiment of this invention, any access by a payphone 10 to one of the servers in the first group transits through the specific server PROXY whereas access to the servers in the second group is made directly without using PROXY 6. According to this embodiment, the server FTP 4 is not connected to PROXY 6. This is because, due to the FTP 4 server's specificity, this connection is not necessary, but remains however monitored by the supervision server 5.

According to another embodiment of this invention, all or part of the servers using a protocol that is identical or compatible with that of payphones 10 may be integrated with the first group, the composition of each group being then based on other criteria than the sole compatibility or incompatibility of the protocols.

According to another embodiment of this invention, the PROXY 6 may also be used as a compulsory way to access the servers in the second group, and thus to all the servers likely to be called by payphone 10. As an alternative, access to servers in the second group by PROXY 6 may be limited to only one part of the communication.

According to the embodiment described in FIG. 1, the server PROXY 6 as well as the servers 4, 5 and 9 are accessible over a network 3 distinct of network 2. This network 3 is for instance an Ethernet or Token Ring network. Obviously, localization of servers 4, 5 and 9 on the network 3 is not limiting the invention. So, all or part of these servers may be localized on other networks.

As shown in FIG. 1, the connection between the PSTN 2 network and the Ethernet 3 network for information transmission is made through a router NAS 8 (Network Access Server). This router is responsible for putting into communication payphones 10 with servers 4, 5, 6, 71, 72, 9 by routing via IP addresses allocated to the servers. The physical layer of the telephones is achieved here with analogue or digital modems (ISDN). Practically, the router 8 may comprise a type 3620 CH router, manufactured by the Cisco company.

This router ensures connection between networks 2 and 3 and therefore concerns more specifically low layers (1 to 3) according to the IETF parts list (Internet Engineering Task Force). Also, the NAS 8 router manages an IP address table of the various servers in existence and accessible over network 3.

Obviously, such structure is not limiting the invention and any other device allowing communication of payphones 10 with the server PROXY 6 may be used.

PROXY 6 combines various functions. A first function consists in directing the requests by payphones 10, depending on the nature of such requests, towards the corresponding servers. This is a re-routing function allowing the storing and updating of the address list of servers likely to be called by payphones 10 only in the PROXY 6 and not in each of the telephone terminals 10, those having then only to know the sole PROXY 6 address. Such arrangement much facilitates the maintenance operations of the payphone network.

Thus, to communicate with PMS 5, it is sufficient for a telephone to address a message to PROXY 6, for which the heading, for instance "PMScall", is enough to be interpreted by PROXY 6 as a message for PMS 5. It is then up to PROXY 6 to find in its memories the IP address of the PMS 5 and to pass on the message to it.

A second function consists whenever necessary in translating the data or instructions transmitted by payphones 10 into the format of the server addresses. Thus for connections to Internet and Web, it is a question of translating the protocol used by payphones 10 into http protocol, and inversely to transfer information from the Web and Internet to payphones 10.

Another function of PROXY 6 is to synchronize and regulate the information exchange sessions between the payphones 10 and the servers. Another function is to set information exchange sessions that are reliable and authenticated, consisting for instance in identifying in a sure way the payphones 10 during an information exchange with the servers, or also to encode the data in order to secure the communication if needed.

Another function of the PROXY 6 is to pilot and regulate the information exchanges made via transfers of files that are standard and complying with the Internet protocols. During these transfers, PROXY 6 must in particular detect any viruses that may infect the files.

A function of server 6 is also to direct requests from payphones towards emergency servers in particular if a server is not available and thus ensure architecture's redundancy. Thus, if PROXY 6 cannot be accessed because in particular of maintenance operations, it is then possible to direct daily reports of the involved payphones 10 towards another management server that is then available. Such switching of a server to another is then fully clear for the payphones 10 that therefore do not have to manage themselves the emergency addresses but only the PROXY 6 address.

Practically PROXY 6 may consist in a PC computer operating under Windows NT (registered trademark). Any request for connection to a server enters via the input port of the computer that is constantly listened to by PROXY 6, and then is redirected to a working port. The request is then analyzed using a software application, for instance in Java language (registered trademark) allowing the monitoring and installation of a session in the protocol meaning of the word. A standard interface (socket) is then open and the request is transmitted to the recipient server and inversely.

Obviously, the embodiment shown has only been given as an example and is definitely not limiting for the whole of solutions that may be implemented through this invention.

Thus PROXY 6, the server PMS 5 and the server FTP 4, instead of being separate machines as in FIG. 1, may be grouped into a single computer, for instance of the PC type.

Thus, any network of devices needing to transfer information in particular to a management server, for instance timers, automatic dispensers or bank terminals may replace the payphone network previously described.

What is claimed is:

1. Telephony system, comprising:

a number of payphones intended for communication with servers via at least one communication network during at least an information exchange session, wherein the servers comprise a first group of servers and a second group of servers, wherein the second group of servers are distinct from the first group of servers; and a communication interface able to monitor communications between the said payphones and the first group of servers and the second group of servers being exempted from monitoring by the communication interface.

2. System according to claim 1 wherein a server address called by a payphone is stored in a memory of the said communication interface with the payphones having then only a communication interface address.

3. System according to claim 1 wherein the said communication interface includes means able to translate the information exchange sessions between the said payphones and the said servers transiting via the said communication interface when the said information exchange sessions are set up with servers using communication protocols distinct from those of the payphones.

4. System according to claim 1 wherein each of the said payphones is equipped with Internet communication protocols TCP/IP and wherein the communications between the said payphones and the said servers use the said protocols TCP/IP.

5. System according to claim 1 wherein the said servers comprise at least an information server.

6. System according to claim 1 wherein the said communication interface includes means able to synchronize and regulate the information exchange session between the said payphones and the said servers transiting via the said communication interface.

7. System according to claim 1 wherein the said communication interface includes means able to authenticate information exchange sessions between the said payphones and the said servers transiting via the said communication interface.

8. System according to claim 1 wherein the said communication interface includes means able to detect a possible virus concerning information transmitted during the information exchange sessions between the said payphones and the said servers transiting via the said communication interface.

9. System according to claim 1 wherein the servers comprise at least a service provider server that provides an Internet and Web service.

10. System according to claim 1 wherein the servers comprise at least a private information server.

11. System according to claim 1 wherein the servers comprise at least a server dedicated to payphone management.

* * * * *